United States Patent
Fink

(10) Patent No.: US 6,253,410 B1
(45) Date of Patent: Jul. 3, 2001

(54) WIPER ARM ASSEMBLY FOR A VEHICLE WINDSHIELD WIPER DEVICE

(75) Inventor: Andreas Fink, Grossbottwar (DE)

(73) Assignee: Itt Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/308,373

(22) PCT Filed: Sep. 18, 1997

(86) PCT No.: PCT/EP97/05120

§ 371 Date: Jul. 1, 1999

§ 102(e) Date: Jul. 1, 1999

(87) PCT Pub. No.: WO98/22317

PCT Pub. Date: May 28, 1998

(30) Foreign Application Priority Data

Nov. 15, 1996 (DE) .............................. 196 47 347
Sep. 18, 1997 (WO) .................... PCT/EP97/05120

(51) Int. Cl.[7] ........................................ B60S 1/32
(52) U.S. Cl. ..................................... 15/250.351
(58) Field of Search .............. 15/250.351, 250.352, 15/250.23, 250.33, 250.32, 250.361, 250.44

(56) References Cited

U.S. PATENT DOCUMENTS 2,250,331 * 7/1941 Horton ........................ 15/250.351
3,832,751 * 9/1974 Ursel et al. ................. 15/250.351
5,729,861 * 3/1998 Journee ...................... 15/250.351

FOREIGN PATENT DOCUMENTS

| 2352 536 | * 4/1975 | (DE) .............................. 15/250.351 |
| 37 44 237 | 12/1987 | (DE) . |
| 43 14 414 | 5/1993 | (DE) . |
| 44 06 131 | 2/1994 | (DE) . |
| 196 05 428 | 2/1996 | (DE) . |
| 2 526 382 | 11/1983 | (FR) . |

* cited by examiner

Primary Examiner—Gary K. Graham
(74) Attorney, Agent, or Firm—J. Gordon Lewis

(57) ABSTRACT

A wiper arm assembly for the windshield wiper of a vehicle. The wiper arm assembly includes a wiper arm and a wiper blade pivotably engaged. The wiper arm is affixed to a wiper shaft. The wiper blade includes a carrier frame for holding and guiding a rubbery elastic wiper strip. The wiper arm assembly also includes an additional support element rigidly joined to the wiper arm, spaced apart from a pivot axis between the wiper arm and the wiper blade. The additional support element engages the wiper blade on the wiper strip and supports the wiper blade in the wiping direction and counter to the wiping direction.

13 Claims, 1 Drawing Sheet

WIPER ARM ASSEMBLY FOR A VEHICLE WINDSHIELD WIPER DEVICE

FIELD OF THE INVENTION

The invention pertains to a wiper arm assembly for a vehicle windshield wiper device.

BACKGROUND OF THE INVENTION

A wiper arm assembly is already known from DE 3,744, 237 A1. The wiper arm is equipped with an additional support element, which is rigidly mounted on the wiper bar of the wiper arm and engages on the inner leg of the wiper blade carrier frame facing the wiper shaft. This support element serves to support the wiper blade in and counter to the wiping direction of the wiper arm in order to avoid undesirable clatterings of the wiper strip on the windshield to be wiped when the windshield wiper device is in operation. On the one hand, these clatterings lead to a disturbing noise buildup, and on the other hand, the so-called clatter marks on the windshield can obstruct vision to a serious extent. However, since the wiper blade frame consists of a hard material, the muffling of the clattering noise achievable with such a wiper arm is still unsatisfactory. On the other hand, the achievable abatement of the clattering itself is not satisfactory, since the wiper strip lying against the windshield is comparably deformable due to its elasticity and is also held and guided on the carrier frame with a certain amount of play related to its function.

SUMMARY OF THE INVENTION

The objective of the invention is to achieve, by way of simple and cost-favorable measures, effective suppression of the undesirable clattering of the wiper blade on the windshield to be wiped.

According to the invention, this objective is realized with a wiper arm according to the present invention. Since the additional support element rigidly joined to the wiper arm engages directly with the wiper strip of the wiper blade, its lateral oscillation on an axis essentially perpendicular to the windshield to be wiped, which gives rise to the undesirable clattering, is effectively suppressed. An additional advantage derives from the fact that the support element directly engages with the wiper strip of a rubbery elastic material. This material pairing of the support element and the wiper strip suppresses the development of disturbing noise, which in the known state of the art comes from the contact between the support element and the carrier frame of the wiper blade.

Advantageous refinements of the invention are described below.

One embodiment of the invention provides that the wiper strips, at least in those sections on their opposite longitudinal sides, have one or more outward projecting support ribs or support plates, which rest on the inner sides of the leg belonging to the support element. With this measure, a secure lateral support and tracking of the wiper strip on the support element is ensured, especially when the wiper strip is guided without play on the inner side of the leg of the support element. With regard to the suppression of noise, this refinement is also advantageous, since oscillations can be transmitted to an essentially less extent via thin or flat support ribs or support plates than via a massive body. When this wiper strip is fabricated by molding in a form, the variant with the support ribs or support plates only on those sections where the wiper strip makes contact with the support element can be advantageous in the sense of a material pairing. However, if a cost-favorable wiper strip produced by extrusion is provided for the wiper blade, an alternative variant is recommended in which the lateral support ribs or support plates extend over the full length of the wiper strip.

At the present time, an embodiment of the invention is considered to be especially advantageous where provision is made for the support element to engage the inner end section of the wiper strip. The inner end section of the wiper strip is understood to encompass the end of the wiper strip, which faces toward the wiper shaft and projects out of the carrier frame. When the windshield wiper device is in operation, the wiper strip executes a semicircular movement on the windshield to be wiped. Here the circumferential speed is slowest at the inner end of the wiper strip. With increasing distance from the wiper shaft the circumferential speed increases and is naturally fastest at the outer end of the wiper strip. It has meanwhile been shown that the influence of the inner end of the wiper strip on the development of clattering is the greatest, since the circumferential speed of this end is the slowest. For this reason, the development of clattering can be best countered when the support element engages this inner end section of the wiper strip directly and indeed directly on the end of the wiper strip.

Also advantageous is an embodiment of the invention which provides that the support element is connected to the hinged part of the wiper arm, especially when the support element is made in one piece with the hinged part of the wiper arm. The one-piece fabrication of the support element with the hinged part ensures especially high stability of the additional support element. On the other hand, this feature can be cost-favorably marketed, regardless whether the hinged part is made of plastic and is therefore principally made as an injection-molded part or stamped and shaped from sheet metal.

An embodiment of the invention can also be advantageous, according to which the additional support element is a separate component, which is rigidly connected to the wiper arm or to the hinged part of the wiper arm. In addition to the other advantages, this refinement specifically offers the possibility of equipping existing wiper arms with the separate support element.

BRIEF DESCRIPTION OF THE DRAWINGS

An embodiment example of the invention is described in greater detail below with references to the appended drawings. Shown in the drawings are.

DESCRIPTION OF THE PREFERRED EMBODIMENT

Figure 1:
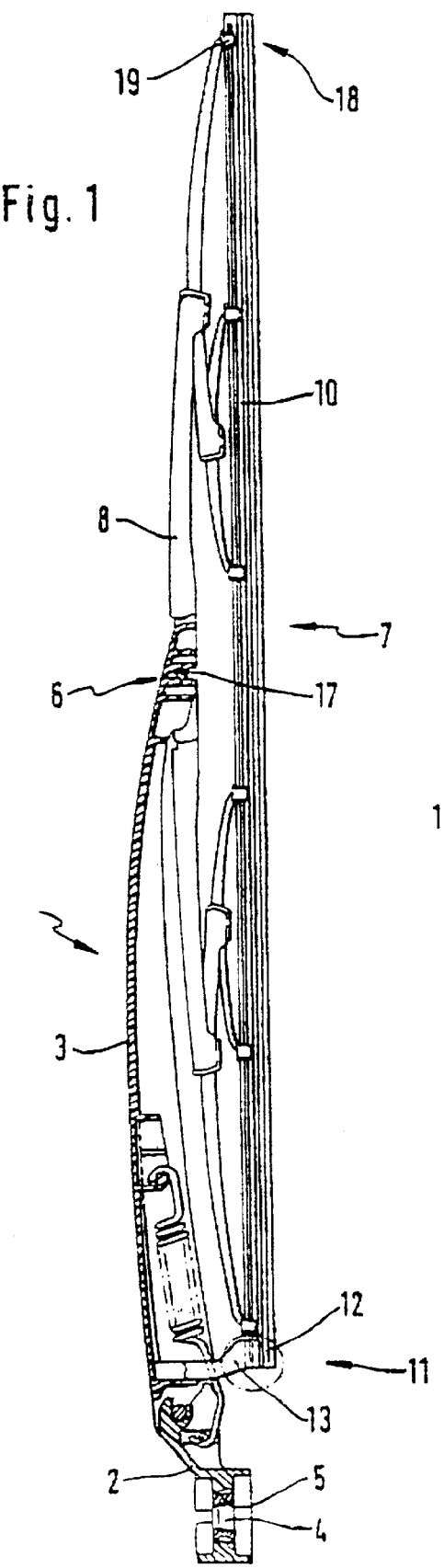
FIG. 1, a wiper arm in partly cutaway presentation.

The wiper arm assembly for a vehicle windshield wiper device shown in FIG. 1 can be intended for cleaning either the windshield or the rear window of the vehicle. The wiper arm assembly has a wiper arm (1), which is formed by an attachment part (2) and a hinged part (3), while the hinged part (3) is pivotably connected to the attachment part (2). Both the attachment part (2) and the hinged part (3) are made from a plastic material, although the attachment part (2) is equipped with a metal insert (5) in the area of a conical receiver opening (4) for the end of an undepicted wiper shaft, which can be driven backward and forward. The free end of the hinged part (3) fabricated as an injection-molded part is directly designed as a connecting piece (6) for pivotable connection with the wiper blade (7). The wiper blade (7) has a carrier frame (8), which is composed of a main bow and several secondary bows and/or collar bows, which are pivotably joined together. A wiper strip (10) of rubbery elastic material equipped with spring tracks (9) is held and guided on the carrier frame (8) in a known manner. The wiper strip (10) is longer than the carrier frame (8), so that, especially on the inner end (11) adjoining the wiper shaft, an end section (12) of the wiper strip (10) projects out of the carrier frame (8). Directly engaging this end section (12) is an additional support element (13), which is formed in one piece with the hinged part (3) of the wiper arm (1).

Figure 2:
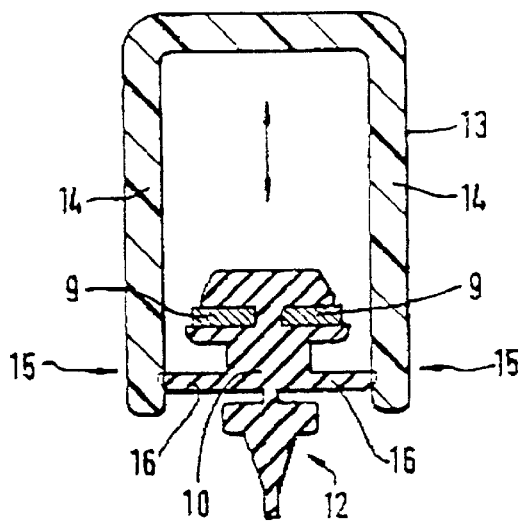
FIG. 2, a detail from FIG. 1 in enlarged and partially cutaway presentation.

It is apparent in FIG. 2 that the additional support element (13) has two separated, parallel legs (14), which are formed in one piece on the hinged part (3) and extend essentially in the direction of the windshield to be wiped. The end section (12) of the wiper strip (10) rests directly on the inner sides of the leg (14) and is thus guided on these legs (14). As a result of this situation, the opposing longitudinal sides of the wiper strip (10) are located on sections (15) of the end section (12), rest directly on the inner sides of both legs (14) of the support element (13). It can also be seen in FIG. 2 that the wiper strip (10) has a support rib 10 (16) on each of its opposite longitudinal sides, which project outward and laterally beyond the remaining contour of the wiper strip (10) equipped with the spring tracks (9). The support ribs (16) rest against the inner sides of the legs (14) with slight elastic pretensioning, whereby the essential pivotability of the wiper blade (7) on the pivoting axis (17) shared with the hinged part (3) is not, however, detracted from, This elastic pretensioning of the support ribs (16) ensures safe and play-free tracking of the wiper strip (10) on the legs (14) of the support element (13) in all operational conditions of the wiper arm assembly. When the windshield wiper device is in operation, the elastic wiper strip (10) adapts to the contour of the glass and the wiper blade (7) is pivoted on the pivoting axis (17) in relation to the hinged part (3). In respect to the support element (13), this means that when the windshield wiper device is in operation, the wiper strip (10) moves back and forth between the two legs (14) of the support element (13) in the direction indicated by the double arrow (FIG. 2).

It can also be seen in FIG. 1 that the end section (12), in which the support element (13) engages on the wiper strip (10), is located at the greatest possible distance from the pivoting axis (17), in which the wiper blade (7) is joined with the hinged part (3). A very large wiper arm assembly is formed thereby, in which the forces acting on the support element (13) or its legs (14) are commensurately slight.

It can be further seen in FIG. 1 that unlike the otherwise generally accepted arrangement, the wiper strip (10) is fixed in the longitudinal direction on the outer end (18) on carrier frame (8) by the outer claw pair (19) of the carrier frame (8). This occurs as the claw of the claw pair (9) engage in corresponding recesses in the longitudinal sides of the wiper strip (10).

What is claimed is:

1. A wiper arm assembly for a vehicle windshield wiper device including a wiper arm affixable on a wipershaft and a wiper blade pivotably joined together at a pivoting axis, while the wiper blade has a carrier frame and a rubbery elastic wiper strip held and guided on the carrier frame and an additional support element rigidly joined to the wiper arm at a distance from the pivoting axis formed between the wiper arm and the wiper blade, the additional support element engages on the wiper blade and supports the wiper blade in and counter to the wiping direction, characterized in that the additional support element engages on the wiper strip.

2. The wiper arm assembly according to claim 1, in which the support element has two parallel legs, which extend with free ends toward a windshield to be wiped and on inner side sections rest opposite longitudinal sides of the wiper strip, characterized in that the wiper strip, at least in the sections has on the opposite longitudinal sides at least one outward projecting support element resting on the inner sides of the legs of the support element.

3. The wiper arm assembly according to claim 2, characterized in that the wiper strip is guided without play on the inner sides of the legs of the support element.

4. A wiper arm assembly according to claim 1, characterized in that the wiper strip is longer than the carrier frame and, at least on an inner end of the wiper blade, an inner end section of the wiper strip longitudinally extends beyond the carrier frame, characterized in that the additional support element engages on the inner end section of the wiper strip.

5. A wiper arm assembly according to claim 1, characterized in that the additional support element is rigidly joined to a hinged part of the wiper arm.

6. The wiper arm assembly according to claim 5, characterized in that the additional support element is formed in one piece with the hinged part of the wiper arm.

7. The wiper arm assembly according to claim 5, characterized in that the additional support element is a separate component.

8. A wiper arm assembly for a vehicle windshield wiper device comprising:
    a wiper arm affixable on a wipershaft;
    a wiper blade pivotably joined to the wiper arm at a pivoting axis, the wiper blade having a carrier frame and a rubbery elastic wiper strip held and guided on the carrier frame; and
    an additional support element rigidly joined to the wiper arm, the additional support element engagable on the wiper blade at a distance from the pivoting axis formed between the wiper arm and supporting the wiper blade in both wiping directions, the additional support element engagable on the wiper strip.

9. The wiper arm assembly of claim 8 further comprising:
    the support element having two parallel legs extending with free ends toward a windshield to be wiped and on inner side sections rest opposite longitudinal sides of the wiper strip, the wiper strip having on the opposite longitudinal sides at least one outward projecting support element resting on the inner sides of the legs of the support element.

10. The wiper arm assembly of claim 8 further comprising:
    the wiper strip having on opposite longitudinal sides at least one support element resting on inner sides of the support element over an entire longitudinal length.

11. The wiper arm assembly of claim 8 further comprising:
    the wiper strip guided on the inner sides of the legs of the support element.

12. The wiper arm assembly of claim 8 further comprising:
    the additional support element formed in one piece with a hinged part of the wiper arm.

13. The wiper arm assembly of claim 8 further comprising:
    the additional support element formed as a separate component.

* * * * *